(12) United States Patent
Lai

(10) Patent No.: US 9,423,063 B2
(45) Date of Patent: Aug. 23, 2016

(54) OIL PIPE FEMALE COUPLER

(71) Applicant: PLUM INDUSTRIAL CO., LTD., Tai Bao (TW)

(72) Inventor: Jung-Tzu Lai, Tai Bao (TW)

(73) Assignee: PLUM INDUSTRIAL CO., LTD, Tai Bao (TW)

( * ) Notice: Subject to any disclaimer, the term of this patent is extended or adjusted under 35 U.S.C. 154(b) by 90 days.

(21) Appl. No.: 14/536,538

(22) Filed: Nov. 7, 2014

(65) Prior Publication Data

US 2016/0131293 A1 May 12, 2016

(51) Int. Cl.
| | |
|---|---|
| F16K 15/00 | (2006.01) |
| F16K 17/00 | (2006.01) |
| F16K 21/04 | (2006.01) |
| F16L 37/28 | (2006.01) |
| F16K 1/42 | (2006.01) |
| F16L 37/407 | (2006.01) |

(52) U.S. Cl.
CPC ............... *F16L 37/407* (2013.01); *F16K 1/425* (2013.01); *F16K 1/42* (2013.01)

(58) Field of Classification Search
CPC ............ F16K 1/42; F16K 1/425; F16K 1/14; F16K 1/34; F16L 37/28
USPC ............. 137/15.09, 15.18, 515, 515.5, 515.7, 137/533, 533.15, 539, 539.5, 613, 137/614–614.21; 251/142, 149–149.9, 251/359–365, 335.1–335.3
See application file for complete search history.

(56) References Cited

U.S. PATENT DOCUMENTS

| | | | | | |
|---|---|---|---|---|---|
| 3,827,456 | A | * | 8/1974 | Sheppard | F16K 11/022 137/859 |
| 4,197,875 | A | * | 4/1980 | Schieferstein | F16K 15/04 137/533.11 |
| 4,712,583 | A | * | 12/1987 | Pelmulder | A61M 39/24 137/494 |
| 5,669,418 | A | * | 9/1997 | Wode | B60G 17/0528 137/859 |
| 5,819,792 | A | * | 10/1998 | Reynolds | F04B 43/0733 137/515.7 |
| 6,799,747 | B1 | * | 10/2004 | Lai | F16L 37/127 137/614.04 |
| 2007/0235676 | A1 | * | 10/2007 | Vangsness | A61M 39/045 251/149.2 |
| 2007/0246674 | A1 | * | 10/2007 | Kiehne | A61M 39/26 251/149.6 |

* cited by examiner

*Primary Examiner* — Mary McManmon
*Assistant Examiner* — Hailey K Do
(74) *Attorney, Agent, or Firm* — Symbus Law Group, LLC; Clifford D. Hyra

(57) ABSTRACT

An oil pipe female coupler includes a body, a sealing member, and an oil seal. The body includes a flange having an upwardly projecting annular wall. The sealing member includes an inner annular wall defining a receiving portion, an outer annular wall surrounding the inner annular wall, and a receiving groove between the inner annular wall and the outer annular wall. The oil seal includes an annular ring having a through-hole, an annular wing connected to the annular ring, and an annular block connected to the annular wing. Top and bottom faces of the annular wing tightly abut a bottom face of the inner annular wall of the sealing member and a top face of the second protrusion, respectively. An inner wall face of the annular block tightly abuts an outer wall face of the inner annular wall of the sealing member. A leakage prevention effect is reliably provided.

2 Claims, 2 Drawing Sheets

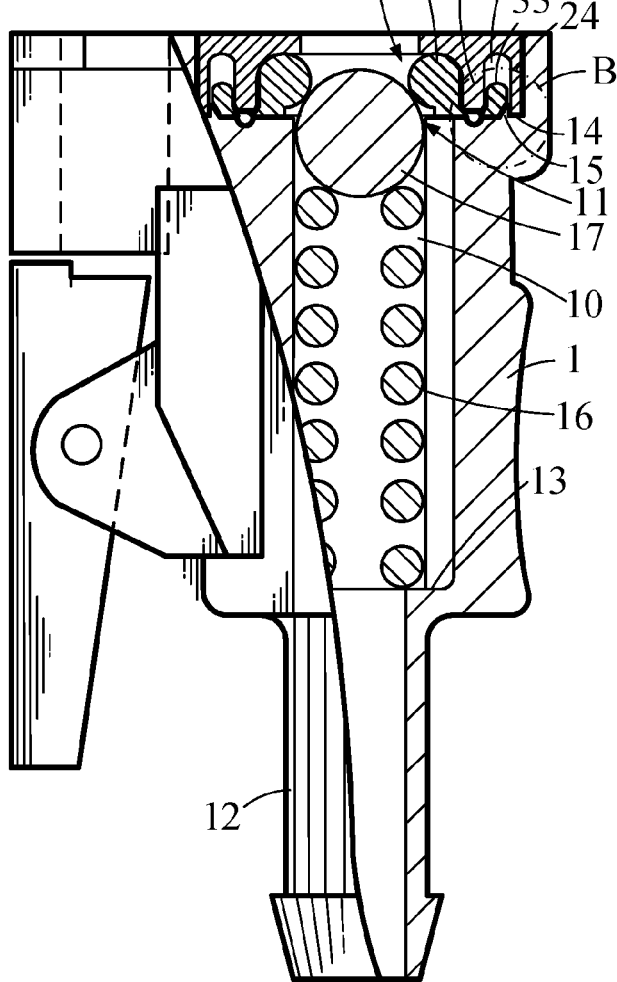
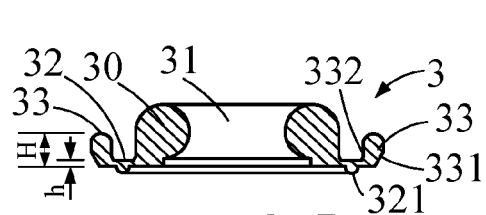
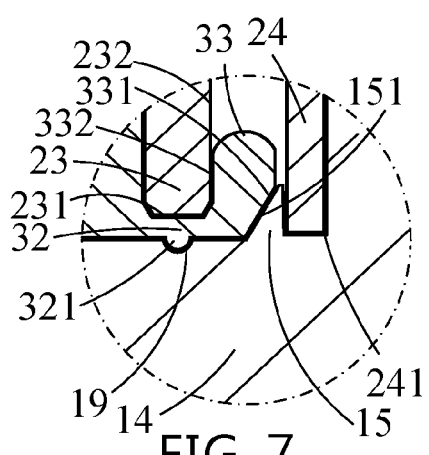
FIG. 5
FIG. 7
FIG. 6

OIL PIPE FEMALE COUPLER

BACKGROUND OF THE INVENTION

The present invention relates to an oil pipe female coupler and, more particularly, to an oil pipe female coupler having a multiple protection structure to provide a leakage prevention effect.

U.S. Pat. No. 6,799,747 issued to Applicant discloses a female coupler for a fueling structure including a body, an oil seal, and a sealing member. A flange is formed on an inner periphery of the body and is located adjacent to an open end of the body. An annular wall projects from a bottom wall of the sealing member. The oil seal is mounted inside the annular wall and includes an annular wing on a face thereof. The annular wing includes a top face and a bottom face. The top face and the bottom face of the oil seal are respectively pressed against by the annular wall of the sealing member and the flange of the body, providing a leakage prevention structure. The whole annular face of the open end of the body and the bottom wall of the sealing member are welded together by ultrasonic welding, providing another leakage prevention leakage. A dual leakage prevention effect is, thus provided. The oil pipe female coupler provides ideal leakage prevention. Nevertheless, Applicant deems providing an additional leakage prevention structure in addition to the dual leakage prevention will be a significant improvement, and this is the motive of the present invention to solve the this issue.

BRIEF SUMMARY OF THE INVENTION

An oil pipe female coupler according to the present invention includes a body, a sealing member, and an oil seal having a through-hole. The body including a hollow interior, an open end intercommunicated with an upper end of the hollow interior, and a connection end intercommunicated with a lower end of the hollow interior. The hollow interior is tubular. An elastic element and a ball are received in the hollow interior. The body further includes an inner wall having first and second flanges. An annular wall projects upwards from the second flange and includes cross sections having increasing widths from a top of the annular wall towards a bottom of the annular wall and having a slope. The elastic element includes a bottom end pressing against the first flange. The elastic element further includes a top end pressing against the ball. The ball seals the through-hole of the oil seal.

The sealing member seals the open end of the body. The sealing member includes a through-hole intercommunicated with the open end of the body, an inner annular wall, and an outer annular wall surrounding the inner annular wall. The inner annular wall defines a receiving portion. A receiving groove is defined between the inner annular wall and the outer annular wall. The outer annular wall of the sealing member is welded and fixed to the body by ultrasonic welding.

The oil seal includes an annular ring having the through-hole in a center thereof, an annular wing extending outwards from the annular ring, and an annular block extending outwards from the annular wing. The annular block has a height larger than a height of the annular wing. The annular ring of the oil seal is received in the receiving portion of the sealing member. The annular block of the oil seal is received in the receiving groove of the sealing member. The annular wing of the oil seal includes a top face tightly abutting a bottom face of the inner annular wall of the sealing member. The annular wing of the oil seal further includes a bottom face tightly abutting a top face of the second flange. A bottom of an outer side of the annular block of the oil seal includes a slant face corresponding to the slope of the annular wall. The slant face is pressed by the slope of the annular wall of the second flange of the body. The annular block has an inner wall face tightly abutting an outer wall face of the inner annular wall of the sealing member.

In another aspect, an oil pipe female coupler includes a body, a sealing member, and an oil seal having a through-hole. The body includes a hollow interior, an open end intercommunicated with an upper end of the hollow interior, and a connection end intercommunicated with a lower end of the hollow interior. The hollow interior is tubular. An elastic element and a ball are received in the hollow interior. The body further includes an inner wall having first and second flanges. The second flange includes a groove. An annular wall projects upwards from the second flange and includes cross sections having increasing widths from a top of the annular wall towards a bottom of the annular wall and having a slope. The elastic element includes a bottom end pressing against the first flange. The elastic element further includes a top end pressing against the ball, with the ball sealing the through-hole of the oil seal.

The sealing member seals the open end of the body. The sealing member includes a through-hole intercommunicated with the open end of the body, an inner annular wall, and an outer annular wall surrounding the inner annular wall. The inner annular wall defines a receiving portion. A receiving groove is defined between the inner annular wall and the outer annular wall. The outer annular wall of the sealing member is welded and fixed to the body by ultrasonic welding.

The oil seal includes an annular ring having the through-hole in a center thereof, an annular wing extending outwards from the annular ring, and an annular block extending outwards from the annular wing. The annular wing includes a bottom face having a protrusion. The annular block has a height larger than a height of the annular wing. The annular ring of the oil seal is received in the receiving portion of the sealing member. The annular block of the oil seal is received in the receiving groove of the sealing member. The annular wing of the oil seal including a top face tightly abutting a bottom face of the inner annular wall of the sealing member. The protrusion of the annular wing of the oil seal tightly abuts the groove of the second flange. The annular block of the oil seal includes a slant face pressed by the slope of the annular wall of the second flange of the body. The annular block has an inner wall face tightly abutting an outer wall face of the inner annular wall of the sealing member.

The present invention will become clearer in light of the following detailed description of illustrative embodiments of this invention described in connection with the drawings.

DESCRIPTION OF THE DRAWINGS

FIG. 5 is a cross sectional view of another example of the oil seal according to the present invention.

FIG. 6 is a cross sectional view of an oil pipe female coupler of a second embodiment according to the present invention.

FIG. 7 is an enlarged view of a circled portion B of FIG. 6.

DETAILED DESCRIPTION OF THE INVENTION

Figure 1:
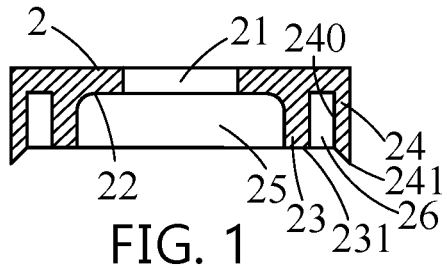
FIG. 1 is a cross sectional view of a sealing member according to the present invention.

With reference to FIGS. 1-4, an oil pipe female coupler of a first embodiment according to the prevent invention includes a body 1, a sealing member 2, and an oil seal 3. The body 1 includes a hollow interior 10, an open end 11 intercommunicated with an upper end of the hollow interior 10, and a connection end 12 intercommunicated with a lower end of the hollow interior 10. The hollow interior 10 is tubular. The connection end 12 can be coupled with a hose (not shown). Fuel can be supplied from a hose into the hollow interior 10 via the connection end 12 and can be outputted via the open end 11 of the body 1. The body 1 further includes an inner wall having first and second flanges 13 and 14. An annular wall 15 projects upwards from an appropriate portion of the second flange 14 for pressing the oil seal 3. The annular wall 15 includes preferably triangular or trapezoidal cross sections having increasing widths from a top of the annular wall 15 towards a bottom of the annular wall 15 and having a slope 151 facing an inner side.

An elastic element 16 and a ball 17 are placed in sequence into the hollow interior 10 of the body 1 via the open end 11. The elastic element 16 includes a bottom end pressing against the first flange 13. The elastic element 16 further includes a top end pressing against the ball 17. Thus, the ball 17 can be biased by the elastic element 16 to press against an annular ring 30 of the oil seal 3 in the sealing member 2 to thereby seal the through-hole 31 of the oil seal 3, forming a leakage prevention structure.

Figure 3:
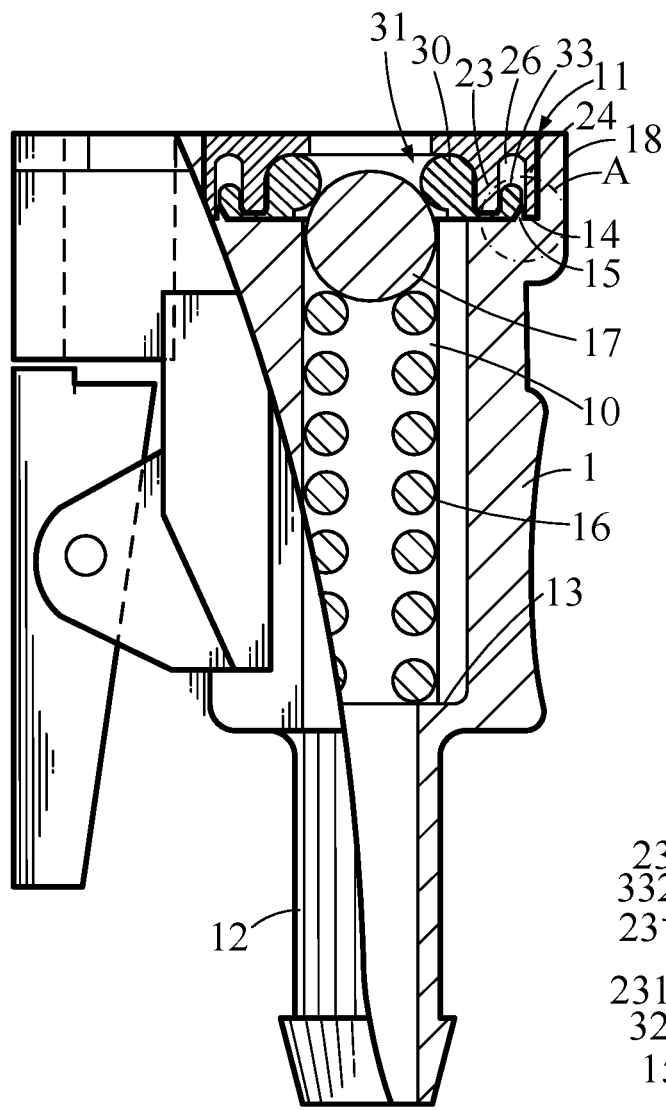
FIG. 3 is a cross sectional view of an oil pipe female coupler of a first embodiment according to the present invention.
Figure 4:
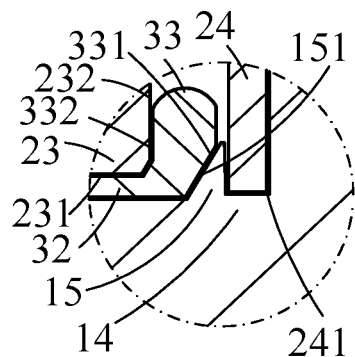
FIG. 4 is an enlarged view of a circled portion A of FIG. 3.

With reference to FIGS. 1, 3 and 4, the sealing member 2 seals the open end 11 of the body 1. The sealing member 2 includes a through-hole 21 formed in a center thereof and intercommunicated with the open end 11 of the body 1, an inner annular wall 23, and an outer annular wall 24 surrounding the inner annular wall 23. The inner annular wall 23 defines a receiving portion 25. A receiving groove 26 is defined between the inner annular wall 23 and the outer annular wall 24. The outer annular wall 24 of the sealing member 2 is welded and fixed to the body 1 by ultrasonic welding. An inner wall face 240 of the outer annular wall 240 and an outer wall face 18 of the body 1 can be welded together to form an integral member. Alternatively, as shown in FIG. 4, a bottom face 241 of the outer annular wall 24 and an appropriate location of an outer side of the annular wall 15 of the second flange 14 of the body 1 are welded together to form an integral member, forming a leakage prevention structure.

Figure 2:
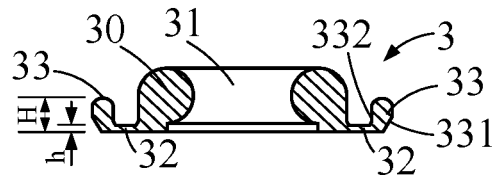
FIG. 2 is a cross sectional view of an oil seal according to the present invention.

As can be seen from FIG. 2, the oil seal 3 includes the annular ring 30 having the through-hole 31 formed in a center thereof and intercommunicated with the open end 11 of the body 1 and the through-hole 21 of the sealing member 2. An annular wing 32 extends outwards from a bottom portion of the annular ring 30 and includes a bottom face flush with a bottom face of the annular ring 30. A width of the annular wing 32 is equal to a width of the bottom face of the inner annular wall 23 of the sealing member 2. An annular block 33 extends outwards from a bottom portion of the annular wing 32, has a height H larger than a height h of the annular wing 32, and has a bottom face flush with the bottom face of the annular wing 32. Preferably, a bottom of an outer side of the annular block 33 of the oil seal 3 includes a slant face 331 corresponding to the slope 151 of the annular wall 15. When the slant face 331 is pressed by the slope 151 of the annular wall 15, a tight abutting relation is provided therebetween to form a leakage prevention structure.

The sealing member 2 coupled with the oil seal 3 can be welded to the body 1 to form an integral member. As can be seen from FIGS. 3 and 4, the annular ring 30 of the oil seal 3 is received in the receiving portion 25 of the sealing member 2, and the annular block 33 of the oil seal 3 is received in the receiving groove 26 of the sealing member 2. A bottom face 231 of the inner annular wall 23 of the sealing member 2 tightly abuts a top face of the annular wing 32. The bottom faces of the annular ring 30, the annular wing 32, and the annular block 33 of the oil seal 3 tightly abut a top face of the second flange 14. Thus, the top and bottom faces of the annular wing 32 respectively and tightly abut the bottom face 231 of the inner annular wall 23 of the sealing member 2 and the top face of the second flange 14, forming a leakage prevention structure. Furthermore, the slant face 331 is pressed by the slope 151 of the annular wall 15, forming a leakage prevention structure. Furthermore, the annular block 33 has an inner wall face 332 tightly abutting an outer wall face 232 of the inner annular wall 23 of the sealing member 2, forming another leakage prevention structure.

FIGS. 5-7 show an oil pipe female coupler of a second embodiment according to the present invention. In this embodiment, the oil pipe female coupler also includes a body 1, a sealing member 2, and an oil seal 3. The structure of the sealing member 2 is the same as that in the embodiment shown in FIG. 1. The differences between the structure of the body 1 of this embodiment and the structure of the body 1 shown in FIGS. 3 and 4 are that the second flange 14 of the body 1 includes a groove 19 facing the bottom face 231 of the inner annular wall 23 of the sealing member 2 and having semi-circular cross sections. The differences between the structure of the oil seal 3 of this embodiment and the structure of the oil seal 3 shown in FIGS. 2-4 are that the oil seal 3 includes a protrusion 321 formed on the bottom face of the annular wing 32 and located corresponding to the groove 19 of the second flange 14 of the body 1. The protrusion 321 has semi-circular cross sections tightly coupling the groove 19 for blocking and sealing purposes. A leakage prevention structure is formed by provision of the protrusion 321 of the annular wing 32 of the oil seal 3 tightly coupling the semi-circular groove 19 of the second flange 14 of the body 1 to achieve the blocking and leakage prevention effect.

In view of the foregoing, the oil seal 3 and the body 1 of the present invention are novel, because they are different from the conventional design in structure. Furthermore, the leakage prevention effect between the slant 331 of the annular block 33 and the slope 151 of the annular wall 15, the leakage prevention effect between the inner wall face 332 of the annular block 33 and the outer wall face 232 of the inner annular wall 23 of the sealing member 2, and the leakage prevention effect between the protrusion 321 on the bottom face of the annular wing 32 of the oil seal 3 and the groove 19 of the second flange 14 of the body 1 cannot be achieved by the conventional design. Thus, the oil pipe female coupler according to the present invention provides multiple protection effects to reduce the deficiency rate of the products.

Thus since the invention disclosed herein may be embodied in other specific forms without departing from the spirit or general characteristics thereof, some of which forms have been indicated, the embodiments described herein are to be considered in all respects illustrative and not restrictive. The scope of the invention is to be indicated by the appended claims, rather than by the foregoing description, and all changes which come within the meaning and range of equivalency of the claims are intended to be embraced therein.

The invention claimed is:
1. An oil pipe female coupler comprising a body, a sealing member, and an oil seal having a through-hole, with the body including a hollow interior, an open end intercommunicated with an upper end of the hollow interior, and a connection end intercommunicated with a lower end of the hollow interior, with the hollow interior being tubular, with an elastic element and a ball received in the hollow interior, with the body further including an inner wall having first and second flanges, with an annular wall projecting upwards from the second flange and including cross sections having increasing widths from a top of the annular wall towards a bottom of the annular wall and having a slope, with the elastic element including a bottom end pressing against the first flange, with the elastic element further including a top end pressing against the ball, with the ball sealing the through-hole of the oil seal, with the sealing member sealing the open end of the body, with the sealing member including a through-hole intercommunicated with the open end of the body, an inner annular wall, and an outer annular wall surrounding the inner annular wall, with the inner annular wall defining a receiving portion, with a receiving groove defined between the inner annular wall and the outer annular wall, with the outer annular wall of the sealing member welded and fixed to the body by ultrasonic welding, and with the oil seal including an annular ring having the through-hole in a center thereof, an annular wing extending outwards from the annular ring, and an annular block extending outwards from the annular wing, with the annular block having a height larger than a height of the annular wing, with the annular ring of the oil seal received in the receiving portion of the sealing member, with the annular block of the oil seal received in the receiving groove of the sealing member, with the annular wing of the oil seal including a top face tightly abutting a bottom face of the inner annular wall of the sealing member, with the annular wing of the oil seal further including a bottom face tightly abutting a top face of the second flange, with a bottom of an outer side of the annular block of the oil seal including a slant face corresponding to the slope of the annular wall, with the slant face pressed by the slope of the annular wall of the second flange of the body, and with the annular block having an inner wall face tightly abutting an outer wall face of the inner annular wall of the sealing member.

2. An oil pipe female coupler comprising a body, a sealing member, and an oil seal having a through-hole, with the body including a hollow interior, an open end intercommunicated with an upper end of the hollow interior, and a connection end intercommunicated with a lower end of the hollow interior, with the hollow interior being tubular, with an elastic element and a ball received in the hollow interior, with the body further including an inner wall having first and second flanges, with the second flange including a groove, with an annular wall projecting upwards from the second flange and including cross sections having increasing widths from a top of the annular wall towards a bottom of the annular wall and having a slope, with the elastic element including a bottom end pressing against the first flange, with the elastic element further including a top end pressing against the ball, with the ball sealing the through-hole of the oil seal, with the sealing member sealing the open end of the body, with the sealing member including a through-hole intercommunicated with the open end of the body, an inner annular wall, and an outer annular wall surrounding the inner annular wall, with the inner annular wall defining a receiving portion, with a receiving groove defined between the inner annular wall and the outer annular wall, with the outer annular wall of the sealing member welded and fixed to the body by ultrasonic welding, and with the oil seal including an annular ring having the through-hole in a center thereof, an annular wing extending outwards from the annular ring, and an annular block extending outwards from the annular wing, with the annular wing including a bottom face having a protrusion, with the annular block having a height larger than a height of the annular wing, with the annular ring of the oil seal received in the receiving portion of the sealing member, with the annular block of the oil seal received in the receiving groove of the sealing member, with the annular wing of the oil seal including a top face tightly abutting a bottom face of the inner annular wall of the sealing member, with the protrusion of the annular wing of the oil seal tightly abutting the groove of the second flange, with the annular block of the oil seal including a slant face pressed by the slope of the annular wall of the second flange of the body, and with the annular block having an inner wall face tightly abutting an outer wall face of the inner annular wall of the sealing member.

\* \* \* \* \*